United States Patent [19]
Dean et al.

[11] 4,455,496
[45] Jun. 19, 1984

[54] ELECTROMAGNETIC VIBRATORY EXCITER

[75] Inventors: Arthur L. Dean; Robert E. Kraft; Kenneth M. Marshall, all of Indiana, Pa.

[73] Assignee: FMC Corporation, Chicago, Ill.

[21] Appl. No.: 352,284

[22] Filed: Feb. 25, 1982

[51] Int. Cl.³ .................................................. H02K 33/00
[52] U.S. Cl. .................................................. 310/29; 310/15
[58] Field of Search .................... 310/17, 19, 15, 28, 310/29, 23, 24, 32

[56] References Cited

U.S. PATENT DOCUMENTS

| | | | |
|---|---|---|---|
| 1,945,015 | 1/1934 | Wurzbach et al. | 310/29 |
| 2,280,610 | 4/1942 | Young | 310/19 X |
| 2,434,337 | 1/1948 | Soderstrom | 310/29 |
| 2,694,156 | 11/1954 | Cerminara | 310/19 |
| 2,898,532 | 8/1959 | Wintermute | 310/19 X |
| 3,293,515 | 12/1966 | Klemm | 310/29 X |
| 3,333,219 | 7/1967 | Making | 310/304 |
| 3,522,460 | 8/1970 | Spurlin | 310/29 |
| 3,764,834 | 10/1973 | Brosch et al. | 310/17 |
| 3,775,625 | 11/1973 | Brosch et al. | 310/19 |

*Primary Examiner*—Donovan F. Duggan
*Attorney, Agent, or Firm*—Douglas W. Rudy; Richard B. Megley

[57] ABSTRACT

An electromagnetic vibrating exciter for use in vibratory equipment incorporates a free non mass housed in an elongated housing having electromagnets mounted inboard at each end of the housing. The free mass is totally enclosed and carries a pair of armatures for cooperation with the electromagnets.

An airgap is maintained during operation between the electromagnet and the armatures through the use of compression elements interposed between the electromagent housing and the armature of the free mass.

16 Claims, 7 Drawing Figures

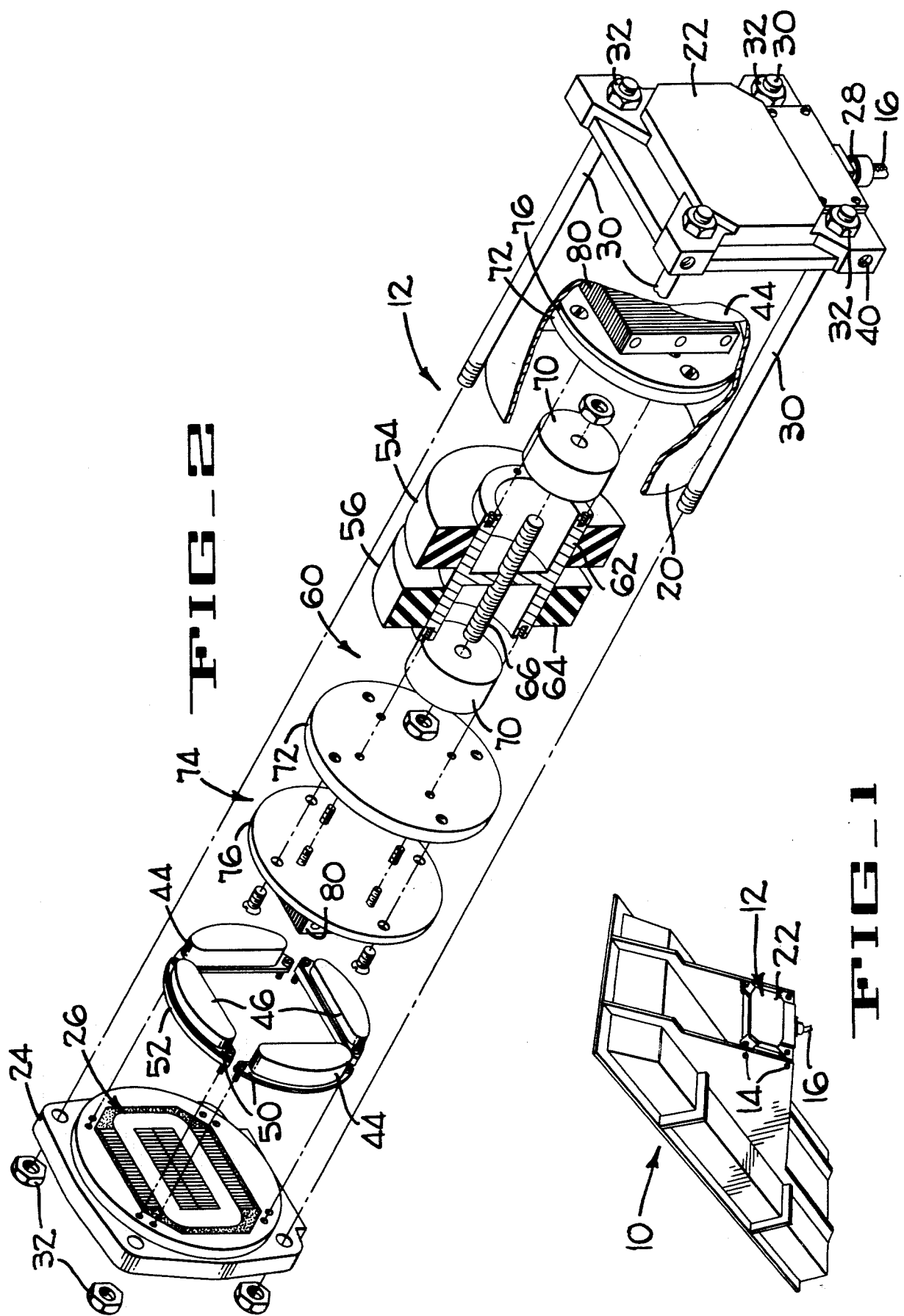

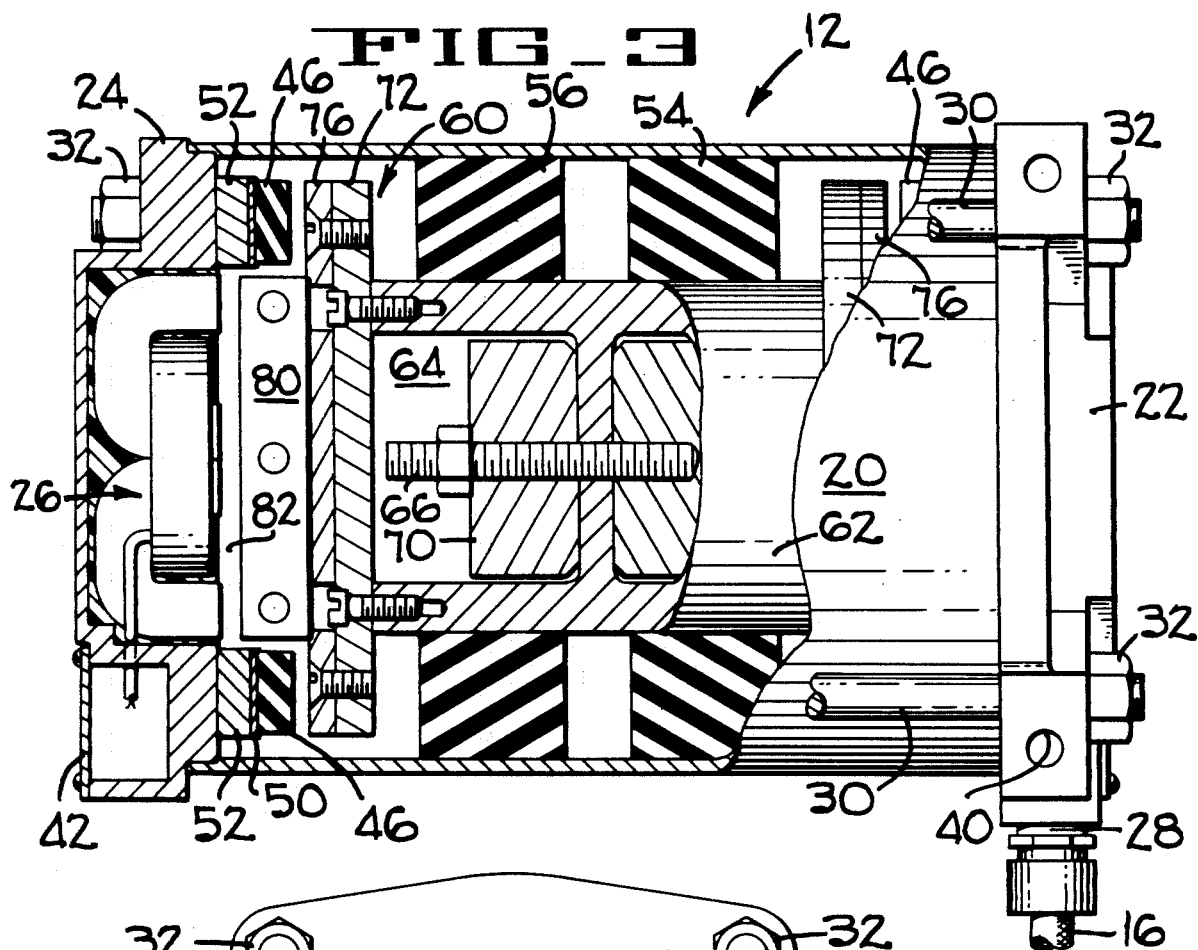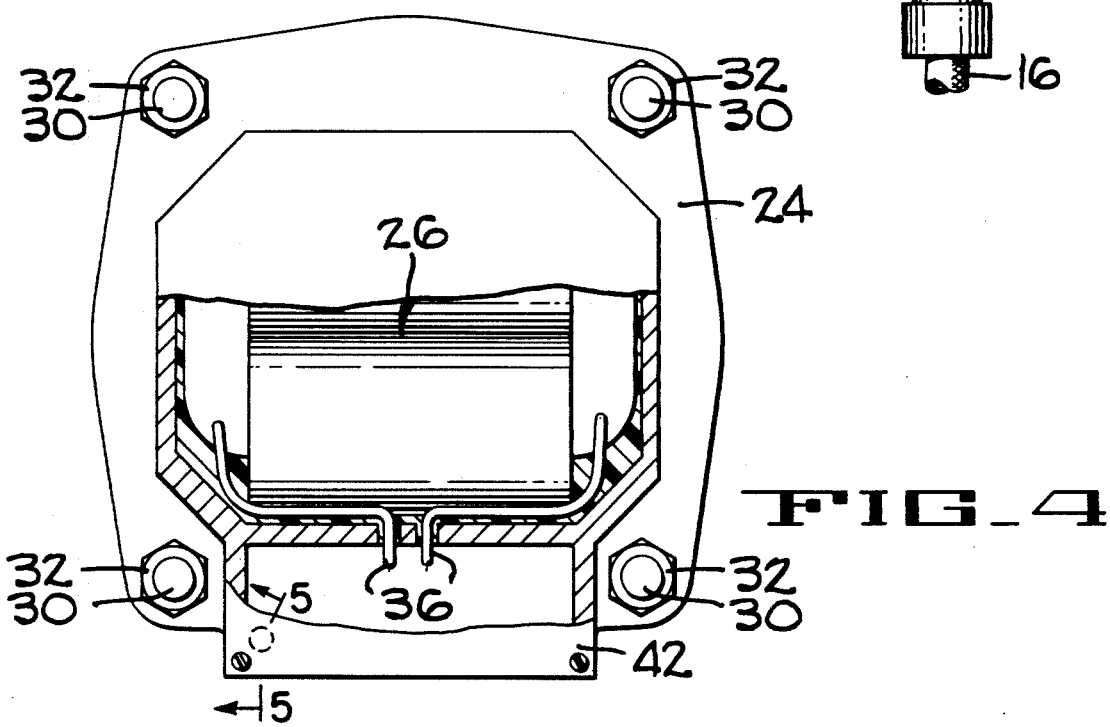

ELECTROMAGNETIC VIBRATORY EXCITER

The invention concerns electromagnetic vibratory exciters for use in imparting vibratory excitation into a host mass for use, for instance, in vibratory conveyor equipment, bin hoppers and chutes for bulk material transport and metered delivery.

Electromagnetic vibratory drive units have been extensively used in industry to ensure the smooth flow of bulk materials from storage bins, hoppers and delivery chutes. Electromagnetic vibratory drive units are also used in vibratory feeders for feeding various bulk materials to mixers, grinders, crushers, packaging machinery, batching, grading or mixing stations. The electromagnetic exciters are coupled to a delivery trough which is vibrated by the exciter to control material flow along the chute, trough, or pan.

In general electromagnetic powered vibratory systems are two mass designs each mass carrying the magnets or armature. The two masses are connected by springs that normally are sized to have the system utilize resonance amplification of the motion. Electromagnets produce useful forces only when the pole faces are in close proximity to each other such as one tenth (0.1) inch or less. The attraction force increases approximately with the inverse of the gap squared. The system motion is divided between the two masses inverse to their weight, that is the higher mass moves proportionately further. The masses move in opposite directions as the air gap between pole faces increases and decreases.

Provisions must therefore be made to prevent the pole faces from striking as they move close to the minimum gap and the magnet force is approaching its peak.

Most magnetic feeders in use have the vibratory motion limited by constraints imposed in the design to maintain this narrow gap. At maximum load the magnets are energized for virtually the full vibration cycle. Striking is prevented by operating the system at larger than ideal air gaps or using less powerful magnets. These systems are limited in energy input and amplitude of motion. Consequently, the exciter mass is made heavier than the driven mass to achieve useful motion of the driven mass. The operating frequency of these drives is 3,000 or 3,600 cpm on available supply frequency of 50 or 60 Hz. The high operating frequency causes unwanted stresses in the structure due to high accelerations. The high operating frequency and low available motion of the driven mass, about 0.06 inches, limit the applicability of these drives in feeding bulk materials. The maximum travel speed of the material is about 40 feet per minute and many materials will not feed well with such short strokes on the driven mass.

A variation of the described electromagnetic drive is one in which the driving mass is made lighter than the driven mass. These systems have even lower stroke on the driven mass of about 0.04 inch and will achieve material travel speed of about 25-30 feet per minute.

The overall weight of the vibratory equipment is reduced for a given material flow capacity. The application range of these type drives is limited by the very small strokes of the driven mass. Also the motion of the driving mass increase considerably with load which requires precision components and feedback control circuits to prevent striking. A known development in electromagnetic drives utilizes a single armature on the driven mass operating between two magnets attached to the driving mass. The operating frequency is 1,500 or 1,800 cpm being one-fourth of the available supply frequencies of 50 and 60 Hz. Large amplitude motions are achieved by energizing each magnet for only a portion of the vibration cycle. The system then vibrates such that the air gaps are near minimum when the magnets are on. A second set of springs are included to prevent striking of the pole faces and store some of the magnet input energy. These springs are engaged only at the extremes of the vibratory motion and thus make the overall spring system a non-linear stiffening spring rate. This low speed and high stroke equipment increases the capability of electromagnetic drive systems.

Versions of this electromagnetic vibratory system, however, are limited in use. The drive mass is three times the weight of the driven mass which thereby has high amplitude motion. This weight relationship is sensitive to load and the motion of the driven mass diminishes significantly as normal loads are applied. The magnets are each energized for about forty percent of the vibratory cycle and do not input sufficent energy to drive the system. Also the control range is very limited. The second spring system has very low deflection and performance falls rapidly when the strokes are reduced slightly and they are no longer engaged. Each magnet is energized by the same polarity which creates DC components in the supply lines. Large equipment cannot be operated in this manner without extensive ballast to balance input power.

Tuning of prior art electromagnetic exciters has presented design problems hampering efficient broad load range functioning of the devices. Close design control of the system parameters had to be exercised to insure that design flow rates were accomplished.

The distribution of motion between the driving and driven masses is inversely proportional to the relative weights of the masses. As a result, the lighter mass is moved proportionally further than the heavier mass and it is typical that the exciters, the driving mass, are made heavier than the driven element.

The prior art electromechanical exciters have operating speeds in ranges around 3,000 cpm. This high cycling speed imposes undesirable stresses in the structure due to high accelerations.

The instant invention provides electromagnetic vibratory exciter which incorporates a totally enclosed free mass carried inside an elongated housing. The housing includes a pair of end caps each receiving a potted electromagnet. The end caps are separated by a housing tube secured between them.

The free mass is suspended by elastomeric shear springs inside the housing tube equidistant from each end cap. A pair of armature assemblies are integral with the free mass, one armature at each end of the generally elongated free mass.

Rubber compression elements are interposed between and normally spaced apart from the free mass and the electromagnet retaining end caps. These non-linear springs help to avoid armature strike and store the input energy during electromagnet conduction resulting in high efficiency.

The electromagnets are sequentially energized through a remotely located controller that is connected to the first electromagnet retaining end cap. An armored conduit extends from the first end cap to the second end cap. Upon energization of the electromagnets in sequence the free mass will be moved longitudinally through the housing and into contact with the elastomeric compression elements and will cycle back and forth responsive to electromagnet energization and de-energization. The frequency of operation is close to the natural frequency of the machine over a broad range of driven weights to utilize resonance.

The apparatus and operation of the invention will be readily understood through perusal of the following description in conjunction with the drawing figures wherein:

FIG. 1 is a simplified illustration of a feeder trough to which the electromagnetic exciter has been mounted;

FIG. 2 is an exploded view of the invention with some components broken away;

FIG. 3 is an elevation view of FIG. 2 with some components broken away and sectioned for clarity;

FIG. 4 is an end view of the device of FIG. 2 with part of the housing broken away and sectioned;

FIG. 5 is a side elevation view of 5—5 of FIG. 4;

Figure 7:
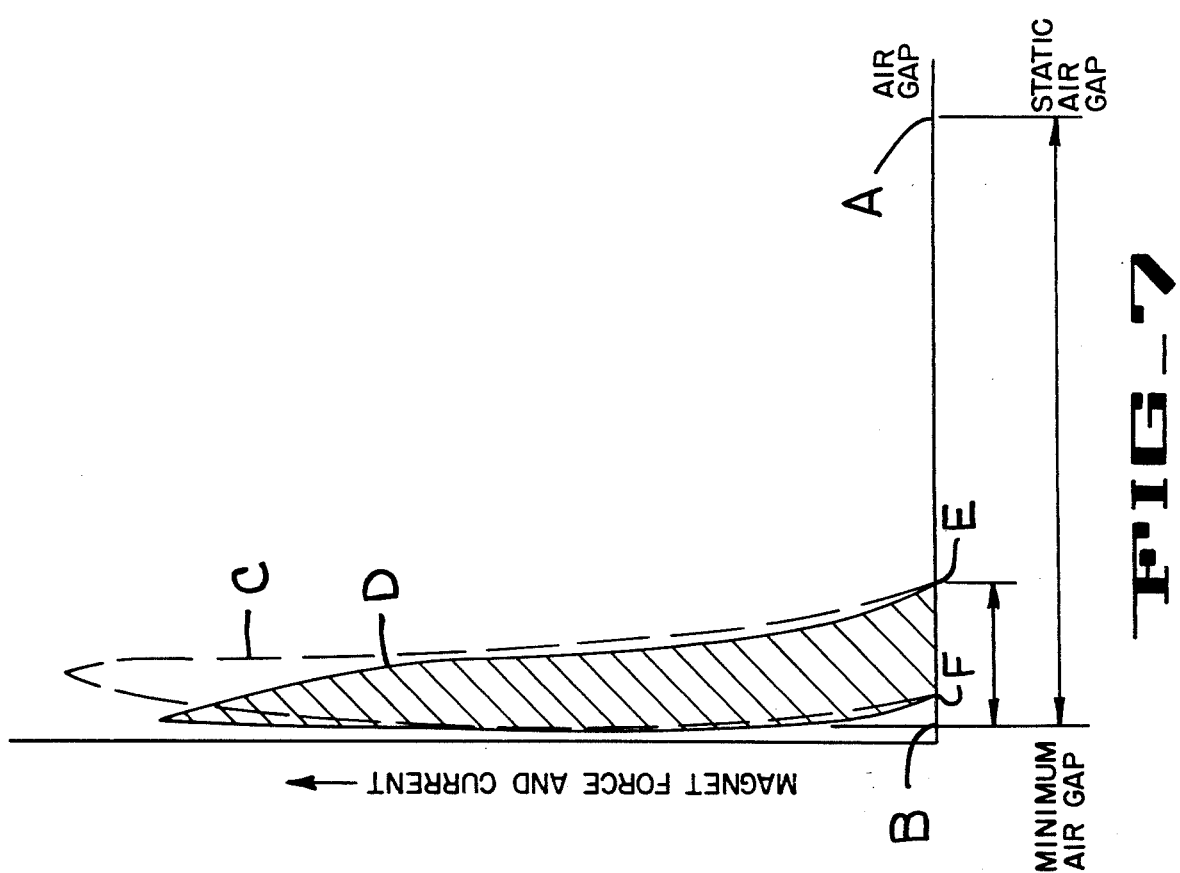
FIG. 7 is a graph showing the energy output of the electromagnet.

A bulk material handling trough generally 10 in FIG. 1 provides a typical application for the electromagnetic vibratory exciter of the invention. The exciter, generally 12, will be fastened to the trough by means such as fasteners 14. A supply conduit 16 will extend from the electromagnetic exciter to a control module typically remotely stationed.

The mechanical aspects of the invention can be easily understood by studying FIG. 2 which is a projected view of the electromagnetic exciter generally 12. The exciter is a unitized closed structure having a housing tube 20 which may be of a sturdy structural material such as aluminum. First and second end caps 22 and 24 respectively act as magnet housings each containing a potted electromagnet such as 26 in end cap 24. The end caps 22 and 24 are placed on opposite ends of the housing tube 20. In one embodiment studs such as 30 are secured with fasteners such as 32 to securely maintain the housing's integrity. The housing is an elongated container that is sealed against intrusion due to its construction. This containerized housing provides the possibility of an explosion proof housing that is not possible with more conventional electromagnetic exciters.

The first end cap 22 is provided with an electrical conduit terminal 28 to accept the supply conduit 16. FIG. 5 shows conduit 34 running between the first and second end caps 22 and 24 for carrying the wire bundle 36 used to provide electrical pulses to the electromagnet 26.

The first end cap 22 may also be provided with threaded apertures such as 40 to provide one method of mounting the electromagnetic exciter generally 12 to the apparatus to be vibrated.

Looking at FIGS. 2, 3 and 4, parts solidly carried inside the housing can be identified. Electromagnet 26, as well as its twin carried at the opposite end of the housing tube 20 (not visable) and its electrical supply wires from the bundle 36 as well as cover plate 42 are clearly shown.

Inside the housing tube and attached to each end cap are elastomeric compression elements such as pairs of elements 44 and 46 making up spring elements that function as the non-linear elements in this system. The pairs differ from each other in the thickness of the elastomeric components.

A first pair 44 of elastomeric compression elements are bonded or otherwise suitably affixed to a backing plate such as 50 which in turn is mounted by fastening means to the inside face of the end plate at each end of the housing tube. A cap of fabric reinforced material may be integral with the elastomeric body portion. The cap would eliminate relative motion between the elastomer and the mounting plate 76 during spring compression. The second pair 46 of elastomeric compression elements 46 are also suitably affixed to a similar backing plate but may have shims, one shown as 52, interposed between the backing plate and the end cap to which it is mounted. The elastomeric compression elements are symmetrically arranged so that pair members are on diametrically opposite sides of the longitudinal axis of the housing. The thickness of the elastomeric compression elements and the shims associated therewith are variables that can be changed in order to provide desirable operating characteristics of a specified electromagnetic exciter. The stacking height of each pair of elastomeric compression elements at each end of the housing may be different from the other pair at the same end so that better control of the non-linear aspect of this spring means is possible. The elastomeric compression elements provide the non-linear stiffening rate and self-limiting deflection of the device.

It should be noted that the housing tube and end caps as well as all the equipment and parts mentioned above are part of the driven mass in the vibrating system since they are integrally connected together in the assembled embodiment.

A free mass generally 60 is totally enclosed and suspended inside the housing tube 20 between the end caps 22 and 24. FIGS 2 and 3 are helpful in identifying its parts. First and second annular rubber or elastomeric shear springs 54 and 56 are pressed into the interior of the elongate housing tube 20 to suspend the free mass generally 60.

The free mass includes a steel central member 62 of a generally elongate configuration having apertured wall portions defining a pair of recesses such as 64. This free mass is supported by and functionally secured to the inside apertures of the first and second annular rubber shear springs. Retainer means such as threaded rod 66 is provided to retain tuning weights such as 70 which may be held in place by fasteners.

The tuning weights such as 70 are important to this invention as they are an interchangeable element that enables changes in the weight of the free mass even though the general sizes and component configuration of the electromagnetic exciter remains constant. Tuning weights can be changed without the need of changing or adjusting the rate of the supporting shear springs during tuning. Thus exciters of different capacities can be manufactured from common components to advantageously utilize economies of scale. Universal tuning is made possible by the proper selection of the natural frequency of the free mass and the shear springs 54 and 56. This universal tuning allows the exciter to deliver rated power regardless of the weight of the driven member to which it is attached.

After the tuning weights are in position the flange plates such as 72 are suitably fastened to the opposite ends of the central member 62. Armature assemblies generally 74, including a mounting plate 76 and a generally rectangular armature 80 are fastened to the flange plate 72. An alternative method of assembly would be to eliminate the mounting plates and mount the armatures directly to the flange plates 72.

Upon assembly of the electromagnetic exciter an air gap 82 exits between the face of the armatures such as 80 and the faces of the electromagnets such as 26 when in a static state. Upon actuation the air gap will cylically decrease and increase but the pole faces will not strike if proper non-linear spring (44, 46) selection has been made.

Figure 6:
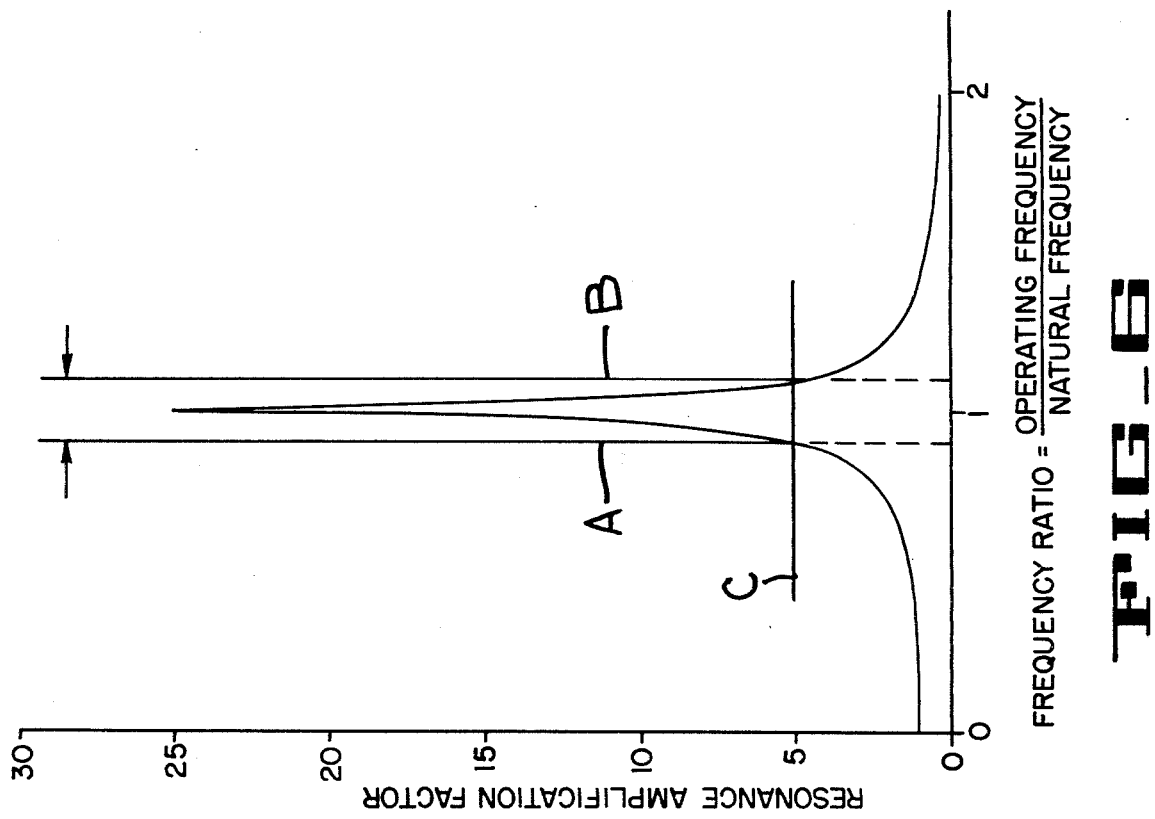
FIG. 6 is a graph showing the frequency response range of the electromagnetic exciter.

It should be mentioned, as is obvious from the drawing figures, that components on the interior of the housing are symetrically similar on each end of the steel central member. The symmetry resulting from this structure and the dual opposing electromagnets is beneficial to good exciter operation. FIGS. 6 and 7 graphically display the advantages gained through the embodiment presented herein.

FIG. 6 graphically represents the universal tuning advantage of the exciter. The frequency ratio on the x-axis shows that maximum amplitude occurs where the operating frequency of the exciter and the natural frequency of the system are the same. The included portion of the curve between A and B represents the operating region for an exciter of a given free mass applied to a broad range of driven weights. The exciter is tuned, by judicious selection of the tuning weights, such that the natural frequency of the system is equal to the operating frequency of the exciter. That would mean that the exciter would be tuned so that the frequency ratio is between A and B for a broad range of driven weights. The resonance amplification in this range is at least five.

The exister would continue to perform efficiently to a super-resonance represented where line B intersects the curve. The resonance amplification factor would again be five. In summary it is apparent that this exciter is close to resonance over a broad weight range of driven masses.

Without the compression elements the pole faces would strike at the higher amplification factors. Line C shows the full system deflection which is maintained by these elements.

In FIG. 7 the electrical power pulse timing and the force produced by the electromagnet is graphically depicted. Each electromagnet is energized once per mechanical cycle. Although not shown in the drawing figures a controller will be remotely mounted from the exciter and designed to supply each electromagnet sequentially with a pulse of electrical energy timed appropriately to energize each electromagnet. The static air gap A at the right side of the graph depicts a position where the armature free mass is equally spaced apart from the electromagnets. Proceeding to the left of the graph towards the minimum air gap the duration of the electrical pulse to the electromagnet is shown by the curve designated as broken line C. The force produced by the electromagnet is shown by curve D while the area under the curve is the energy output of the magnet. The electromagnet is energized during the deflection of the free mass towards the electromagnets in the zone from E to B (the minimum air gap). As the air gap opens current continues to flow back to point F therefore the net energy produced is that indicated by the cross-hatched area under the curve. This energy is stored in the compression springs 44 and 46. Electromagnet coils designed for energization in the manner described make it possible to store significantly more energy per cycle than the designs of the prior art.

Depending on the design of the compression elements this stored energy resulting from the initial impact of the free mass directed toward the compression element provides approximately 30% of the force needed to accelerate the free mass in the opposite direction. This results in an electrical power savings and the attendant cost benefit. Since the compression elements are non-linear any armature striking can be avoided through proper selection of the elements.

What is claimed is:

1. An electromagnetic vibratory exciter comprising:
    an exciter body including a housing supporting a plurality of electromagnet means directed toward the inside of said exciter body;
    a plurality of non-linear spring means carried in said exciter body, one of each of said plurality of non-linear spring means inboard and longitudinally adjacent one of each of said plurality of electromagnet means, each non-linear spring means including a first pair of elastomeric spring means having one of each of said pair mounted diametrically opposite the other of said first pair disposed relative to the longitudinal axis of said exciter body and a second pair of elastomeric spring means having one of each of said pair mounted diametrically opposite the other of said second pair axially disposed relative to the longitudinal axis of said exciter body;
    a free mass including armature means supported for longitudinal movement in said exciter body sequentially toward first one than another of said plurality of electromagnet means.

2. Invention in accordance with claim 1, wherein said first pair of elastomeric spring means are mounted on shim means for spacing said first pair of elastomeric spring means longitudinally away from each of said plurality of electromagnet means.

3. The invention in accordance with claim 1, wherein said elastomeric spring means are provided with a fabric cap on the inboard facing surface thereof.

4. The invention in accordance with claim 1, wherein said first pair of elastomeric spring means have a first compressability factor and said second pair of elastomeric spring means have a second compressability factor.

5. The invention in accordance with claim 1, wherein said free mass is supported by spring means restrained in the interior of said exciter body with said free mass passing therethrough and in axial alignment with said exciter body.

6. The invention in accordance with claim 5, wherein said spring means comprises a plurality of annular elastomeric shear springs fixed to the interior of said exciter body, said spring means allowing longitudinal movement of said free mass.

7. The invention in accordance with claim 5, wherein said free mass comprises:
    a central member supported by said spring means;
    a plurality of armature assemblies affixed to opposite ends of said central member;
    a tuning weight means carried by said central member of said free mass.

8. The invention in accordance with claim 7, wherein said central member incorporates recess means; and
    said tuning weight means is carried in said recess means of said central member.

9. An electromagnetic vibrating exciter having;
    a source of pulsed electrical energy,
    an exciter body electrically connected with said source of pulsed electrical energy, said exciter body including a housing having a pair of end caps, each end cap supporting an electromagnet inside of said exciter body, said pulsed electrical energy directed sequentially to a first and a second of said pair of electromagnets;

a free mass including a first and a second armature means supported for movement in said exciter body;

non-linear spring means including a first pair of elastomeric spring means having one of each of said pair mounted diametrically opposite the other of said pair relative to a longitudinal axis of said exciter body and a second pair of elastomeric spring means having one of each of said pair mounted diametrically opposite the other of said pair relative to said longitudinal axis of said exciter body;

said non-linear spring means carried in said exciter body inboard and longitudinally adjacent one of each of said electromagnets on said end caps.

10. Invention in accordance with claim 9, wherein said first pair of elastomeric spring means are mounted on shim means for spacing said first pair of elastomeric spring means longitudinally away from each of said plurality of electromagnet means.

11. The invention in accordance with claim 10, wherein said first pair of elastomeric spring means have a first compressability factor and said second pair of elastomeric spring means have a second compressability factor.

12. The invention in accordance with claim 9, wherein each of said elastomeric spring means are provided with a fabric cap on the inboard facing surface thereof.

13. The invention in accordance with claim 2, wherein said free mass is supported by spring means restrained in the interior of said exciter body with said free mass passing therethrough and in axial alignment with said exciter body.

14. The invention in accordance with claim 13, wherein said spring means comprises a plurality of annular elastomeric shear springs fixed to the interior of said exciter body, said spring means allowing longitudinal movement of said free mass.

15. The invention in accordance with claim 13, wherein said free mass comprises:

a central member supported by said spring means;

a plurality of armature assemblies affixed to opposite ends of said central member;

a tuning weight means carried by said central member of said free mass.

16. The invention in accordance with claim 15, wherein said central member incorporates recess means and said tuning weight means is carried in said recess means of said central member.

* * * * *

UNITED STATES PATENT AND TRADEMARK OFFICE
CERTIFICATE OF CORRECTION

PATENT NO. : 4,455,496

DATED : June 19, 1984

INVENTOR(S) : A. L. Dean, et al.

It is certified that error appears in the above-identified patent and that said Letters Patent are hereby corrected as shown below:

-- In the Abstract

-- Column 1, line 2    cancel the word "non" in this line

Signed and Sealed this

Seventeenth Day of June 1986

[SEAL]

Attest:

DONALD J. QUIGG

Attesting Officer    Commissioner of Patents and Trademarks